(12) United States Patent
Okada (10) Patent No.: US 10,913,225 B2
(45) Date of Patent: Feb. 9, 2021

(54) METHOD OF MANUFACTURING OPTICAL FIBER AND OPTICAL FIBER

(71) Applicant: FUJIKURA LTD., Tokyo (JP)

(72) Inventor: Kenji Okada, Sakura (JP)

(73) Assignee: Fujikura Ltd., Tokyo (JP)

( * ) Notice: Subject to any disclaimer, the term of this patent is extended or adjusted under 35 U.S.C. 154(b) by 242 days.

(21) Appl. No.: 16/041,007

(22) Filed: Jul. 20, 2018

(65) Prior Publication Data

US 2019/0047238 A1 Feb. 14, 2019

(30) Foreign Application Priority Data

Aug. 9, 2017 (JP) .................................. 2017-154288

(51) Int. Cl.
| | |
|---|---|
| *B29D 11/00* | (2006.01) |
| *G02B 6/44* | (2006.01) |
| *B65H 55/04* | (2006.01) |
| *B65H 54/02* | (2006.01) |
| *G02B 1/04* | (2006.01) |
| *G02B 6/02* | (2006.01) |

(52) U.S. Cl.
CPC .. *B29D 11/00663* (2013.01); *B29D 11/00721* (2013.01); *B65H 55/04* (2013.01); *G02B 6/4457* (2013.01); *B65H 54/02* (2013.01); *B65H 2701/32* (2013.01); *G02B 1/045* (2013.01); *G02B 6/02395* (2013.01)

(58) Field of Classification Search
None
See application file for complete search history.

(56) References Cited

U.S. PATENT DOCUMENTS

| | | | |
|---|---|---|---|
| 2001/0046358 A1 | 11/2001 | Sasaoka et al. | |
| 2003/0007775 A1* | 1/2003 | Takahashi | G02B 6/4457 385/147 |
| 2011/0188822 A1 | 8/2011 | Konstadinidis et al. | |

FOREIGN PATENT DOCUMENTS

| | | |
|---|---|---|
| JP | H05-273416 A | 10/1993 |
| JP | 2001048569 A | 2/2001 |
| JP | 2003212588 A | 7/2003 |
| JP | 2004323272 A | 11/2004 |
| JP | 2017024814 A | 2/2017 |
| JP | 2017102330 A | 6/2017 |

OTHER PUBLICATIONS

J. Baldauf et al.; "Relationship of Mechanical Characteristics of Dual Coated Single Mode Optical Fibers and Microbending Loss"; IEICE Trans. Commun., vol. E76-B, No. 4, pp. 352-357; Apr. 1993 (6 pages).
Notice of Allowance in counterpart Japanese Patent Application No. 2017-154287 dated Apr. 16, 2019 (3 pages).

\* cited by examiner

*Primary Examiner* — Queenie S Dehghan
(74) *Attorney, Agent, or Firm* — Osha Bergman Watanabe & Burton (57) ABSTRACT

A method of manufacturing an optical fiber, in which a coating is provided on a bare optical fiber, includes winding the optical fiber around a bobbin such that a strain sensing coefficient $T_{\varepsilon/KL}$ is greater than 0 and less than or equal to 973, and a one-layer strain $\varepsilon_n$ is greater than or equal to 0.01.

3 Claims, 2 Drawing Sheets

METHOD OF MANUFACTURING OPTICAL FIBER AND OPTICAL FIBER

TECHNICAL FIELD

The present invention relates to a method of manufacturing an optical fiber and an optical fiber.

Priority is claimed on Japanese Patent Application No. 2017-154288, filed on Aug. 9, 2017, the content of which is incorporated herein by reference.

BACKGROUND

In the related art, a method of manufacturing an optical fiber including a step of winding an optical fiber around a bobbin is used, the optical fiber having a structure in which a coating is provided on a bare optical fiber. For example, Japanese Unexamined Patent Application, First Publication No. H5-273416 discloses a method of reducing a tension (hereinafter, referred to as "winding tension") in which an optical fiber is wound around a bobbin along with an increase in winding radius. In this method, transmission loss of the optical fiber wound around the bobbin is measured using an optical time domain reflectometer (OTDR). It is possible to prevent an increase in a loss value when the optical fiber is wound around the bobbin. Therefore, the loss can be more accurately measured.

However, recently, the size of an optical fiber preform has increased to reduce the costs of an optical fiber, and it is necessary to increase the length of an optical fiber wound around one bobbin in order to improve the manufacturing efficiency. Here, as a result of thorough investigation, the present inventors found that, in a case where an optical fiber having a longer length is wound around one bobbin, a coating of the optical fiber is deformed depending on winding conditions. Further, it was found that, due to the deformation, transmission loss in a low-temperature environment becomes higher than that of an optical fiber in the related art.

In addition, in a case where the winding tension is reduced in order to suppress the deformation of the coating, winding collapse or the like is likely to occur.

SUMMARY

One or more embodiments of the present invention provide a method of manufacturing an optical fiber in which winding collapse can be prevented while suppressing deformation of a coating of an optical fiber.

According to one or more embodiments of the present invention, there is provided a method of manufacturing an optical fiber in which a coating is provided on a bare optical fiber, the method including: a step of winding the optical fiber around a bobbin, in which a strain sensing coefficient $T_{\varepsilon/KL}$ is higher than 0 and 973 or lower, and a one-layer strain $\varepsilon_n$ is 0.01 or higher.

According to one or more embodiments of the present invention, there is provided an optical fiber that is manufactured using the above-described method of manufacturing an optical fiber.

According to one or more embodiments of the present invention, the method of manufacturing an optical fiber can be provided, in which winding collapse can be prevented while suppressing deformation of a coating of an optical fiber.

DETAILED DESCRIPTION

Hereinafter, a method of manufacturing an optical fiber according to one or more embodiments will be described with reference to FIG. 1.

(Manufacturing Device)

Figure 1:
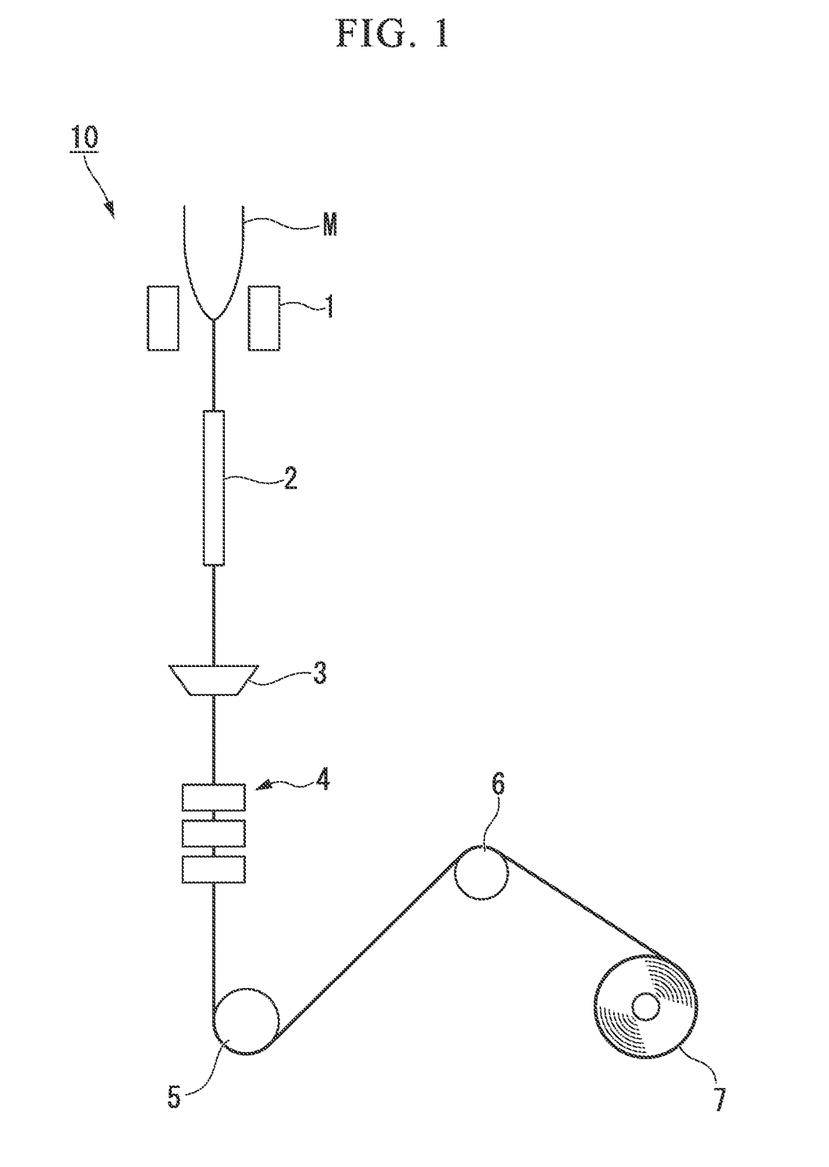
FIG. 1 is a schematic diagram showing a manufacturing device for an optical fiber according to one or more embodiments.

In general, an optical fiber is manufactured by drawing an optical fiber preform M using a manufacturing device 10 according to one or more embodiments shown in FIG. 1. The manufacturing device 10 includes a heater 1, a cooling device 2, a coating device 3, a coating curing device 4, a drawing device 5, a pulley 6, and a winding bobbin 7.

The heater 1 heats an optical fiber preform M inserted into a heating furnace (not shown) to about 2000° C. or higher to melt the optical fiber preform M. In the heating furnace, the optical fiber preform M is heated, melted, thinned, and drawn to form a bare optical fiber (drawing step). The cooling device 2 cools the bare optical fiber that is drawn from the optical fiber preform M. The bare optical fiber may be naturally cooled without using the cooling device 2.

The coating device 3 coats an outer circumference of the bare optical fiber with a coating layer such as an UV-curable resin by die coating or the like. Next, the coated UV-curable resin or the like is cured by the coating curing device 4. This way, the coating device 3 and the coating curing device 4 provide the coating on the outer circumference of the bare optical fiber to form an optical fiber (coating step).

In general, the coating layer has a two-layer structure including a primary layer and a secondary layer. In general, a Young's modulus of the primary layer is about 0.3 to 1.0 MPa, and a Young's modulus of the secondary layer is about 500 to 1500 MPa.

The drawing device 5 is, for example, a drawing capstan, and a drawing rate is determined by the drawing device 5. The drawing rate is, for example, 25 msec or higher. The pulley 6 changes the traveling direction of the optical fiber.

Using a winding device (not shown), a step of winding the optical fiber around the winding bobbin 7 is performed (winding step). The winding bobbin 7 is a bobbin for temporarily winding and holding the optical fiber to be manufactured. In general, the size of the winding bobbin 7 has a barrel diameter φ of about 300 mm to 600 mm and a barrel width of about 500 mm to 1500 mm. The material of the winding bobbin 7 is not particularly limited and, for example, not only a metal material such as aluminum or stainless steel but also a resin material such as a vinyl chloride resin or an ABS resin can be appropriately used.

The optical fiber is wound around the winding bobbin 7, and then one or a plurality of good product candidates are appropriately separated in a step of excluding bad products. Each of the good product candidates has a length of 50 km to 200 km.

Regarding the good product candidate, optical characteristics and the like are measured. A good product candidate that satisfies product standards based on the result of the measurement is determined as a good product and is used as a product. The good product is wound around a bobbin for shipping again and then shipped. Alternatively, a cable is formed from the good product and then shipped.

However, recently, the size of the optical fiber preform M has increased to reduce the costs of an optical fiber. For example, a large optical fiber preform M with which an optical fiber having a length of 1000 km or longer can be manufactured is used. With a larger optical fiber preform M, an optical fiber having a length of 4000 km or longer can be manufactured. On the other hand, the optical fiber can be separated per predetermined length (for example 500 km or 1000 km) and wound around the winding bobbin 7. However, in order to improve the manufacturing efficiency of the optical fiber, the length of the optical fiber wound around one winding bobbin 7 may be as long as possible. As a result, for example, an effect of reducing a period of time for an operation of replacing the winding bobbin 7 can be obtained.

Examples of a method of increasing the length of the optical fiber wound around one winding bobbin 7 include the following two methods:

(1) a method of reducing the barrel diameter of the winding bobbin 7 to increase the thickness (hereinafter, referred to as "winding thickness") of a layer of the optical fiber wound around the bobbin; and (2) a method of simply increasing only the winding thickness.

However, in a case where the winding thickness of the optical fiber around the bobbin is increased, a high lateral pressure is applied to the optical fiber on the lower layer side such that transmission loss of the optical fiber increases. In addition, winding collapse in which the wound state of the optical fiber is disturbed is likely to occur. Further, a period of time from the start of the winding of the optical fiber around the winding bobbin 7 in the drawing step until the feeding of the optical fiber wound around the winding bobbin 7 in the subsequent step ends relatively increases. That is, a period of time until the optical fiber is released from the lateral pressure increases.

In order to prevent winding collapse, it is efficient to increase the winding tension. That is, as the winding tension applied for winding increases, the wound state is more likely to be maintained, and winding collapse is less likely to occur. However, in a case where the winding tension is high, deformation of the coating layer of the optical fiber increases. Further, this deformation does not return to the initial state even in a state (free coil state) where the winding tension is not applied by drawing the optical fiber from the winding bobbin 7. In particular, in a case where the Young's modulus of the primary layer is set to be low in order to reduce transmission loss when micro bending is applied to the optical fiber, the deformation of the coating layer is likely to occur.

As a result of an investigation, the present inventors found that the deformation of the coating layer has an effect on the result of a temperature characteristic test of −60° C. to +85° C. The temperature characteristic test is described in IEC-60793-2-50 as an evaluation item of optical fibers.

Figure 2:
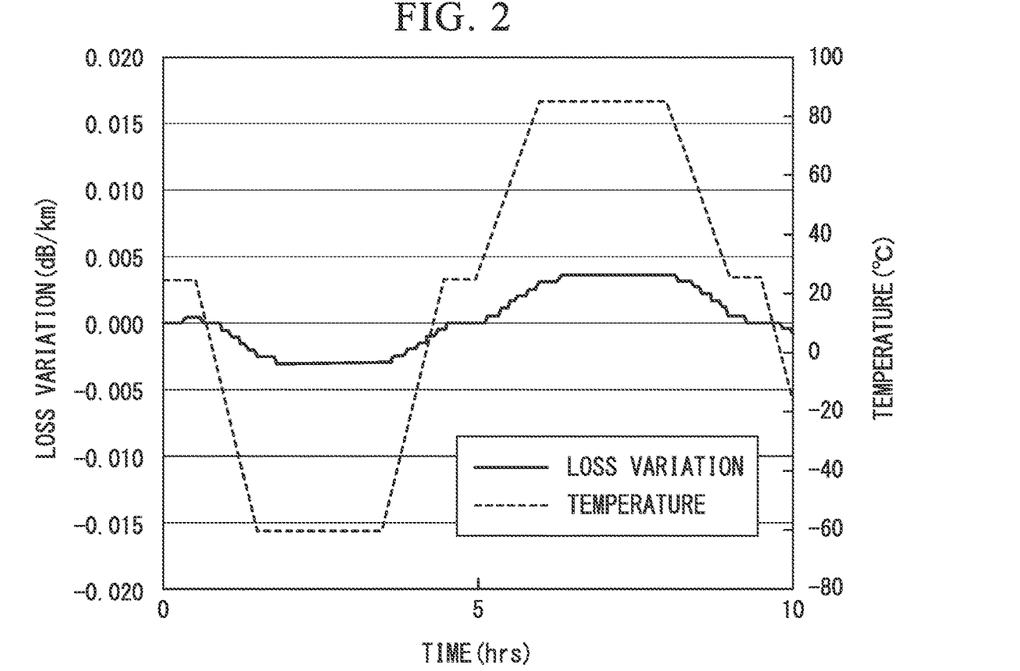
FIG. 2 is a graph showing the result of a temperature characteristic test of an optical fiber where a coating is not deformed according to one or more embodiments.
Figure 3:
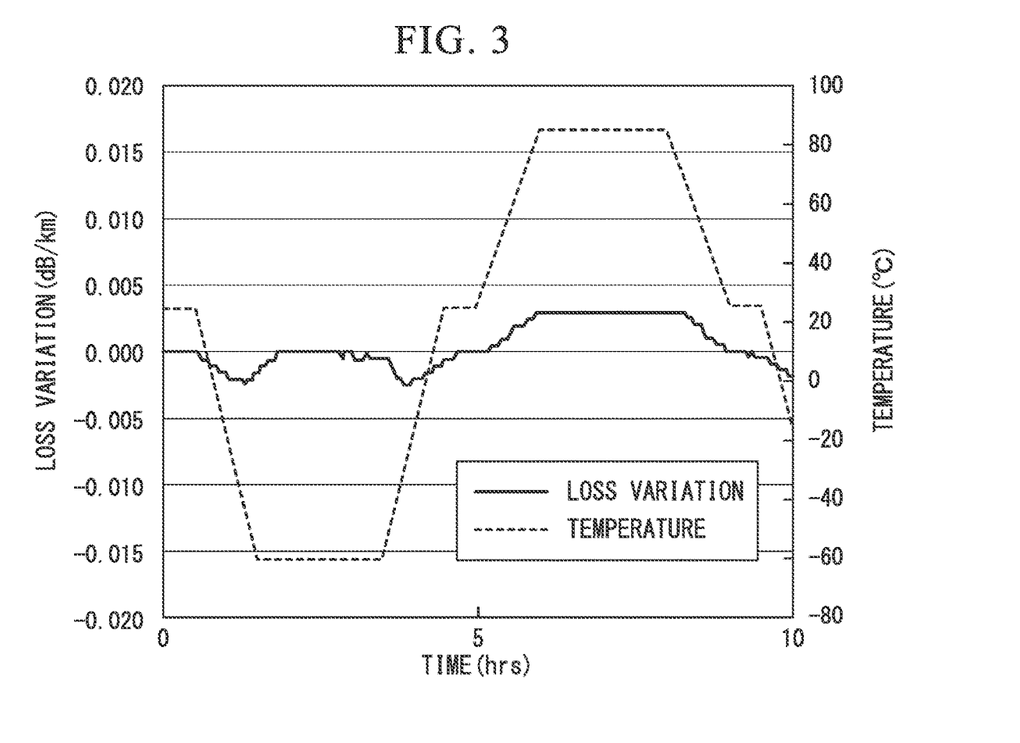
FIG. 3 is a graph showing the result of a temperature characteristic test of an optical fiber where a coating is deformed according to comparative examples.

FIGS. 2 and 3 are graphs showing a relationship between the deformation of the coating layer and the result of the temperature characteristic test. As a test method of the temperature characteristic test, a method defined in IEC-60793-1-52 is used. A measurement wavelength is set as 1550 nm, and a variation from loss (transmission loss) at an environmental temperature of 20° C. is measured. FIG. 2 is a graph showing the measurement result of an optical fiber where the coating layer is not deformed according to one or more embodiments. FIG. 3 is a graph showing the measurement result of an optical fiber where the coating layer is deformed by being wound around the winding bobbin 7 according to comparative examples. During the measurement of data of FIG. 3, the optical fiber is in the free coil state.

As shown in FIG. 2, regarding the optical fiber where the coating layer is not deformed, the value of loss variation is a negative value at a temperature of −60° C. This shows that, in a case where the environmental temperature decreases from 20° C. to −60° C., the transmission loss of the optical fiber decreases. On the other hand, as shown in FIG. 3, regarding the optical fiber where the coating layer is deformed, the value of loss variation returns to about zero at a temperature of −60° C. It can be seen from a comparison between FIGS. 2 and 3 that the transmission loss of the optical fiber where the coating layer is deformed increases in an environment of −60° C. This phenomenon occurs due to the following reasons. The deformation of the coating caused when the optical fiber is wound around the winding bobbin 7 is not canceled out even after the tension is released by drawing the optical fiber from the winding bobbin 7. Further, microbend loss increases due to a comprehensive effect of a change in the characteristics of the coating layer such as an increase in the Young's modulus of the coating layer in a low-temperature environment.

In addition, recently, in a case where a high-intensity optical signal is incident on a core of an optical fiber to propagate a high-speed and large-capacity signal through an optical fiber, an optical fiber having a large effective area (Aeff) has been used in order to reduce nonlinear noise. However, in a case where Aeff increases, microbend characteristics during application of a microbend to an optical fiber tend to deteriorate, and an increase in loss caused by the deformation of the coating layer during application of a lateral pressure may become more significant.

In addition, as described above, the deformation of the coating layer is not canceled out even in a case where the winding tension is released after winding the optical fiber around the winding bobbin 7. The phenomenon in which the coating layer is deformed has a relationship with the holding time in a state where the optical fiber is wound around the winding bobbin 7. For example, in a case where the optical fiber having a length of 2000 km is wound around the winding bobbin 7 at a drawing rate of 2000 m/min, the holding time is about 16.6 hours. In a case where the optical fiber is rewound at the same rate immediately after drawing, the total holding time is about 33 hours.

As described above, the deformation of the coating layer caused when the optical fiber is wound around the bobbin occurs not only winding around the winding bobbin 7 but also during winding around a bobbin for shipping. Accordingly, winding conditions described below is applicable to winding around a bobbin other than the winding bobbin 7. However, from the viewpoint of the holding time or the winding length in a state where the optical fiber is wound around the bobbin, the coating layer is most likely to be deformed in the drawing step during a period from the manufacturing of the optical fiber to the shipment of the optical fiber as a product. Accordingly, the following winding conditions are suitably used particularly in the drawing step.

(Winding Conditions)

As clearly seen from the above description, in a case where the optical fiber is wound around the winding bobbin 7, many parameters such as the Young's modulus of the primary layer, the Young's modulus of the secondary layer, the holding time in the wound state, the winding tension, the winding thickness, and the like are taken into consideration. In consideration of these parameters, it is necessary to set winding conditions such that winding collapse does not occur and the coating layer is not deformed. As a result of thorough investigation, the present inventors found that favorable winding conditions can be obtained by setting values of the following "strain sensing coefficient $T_{\varepsilon/KL}$" and "one-layer strain $\varepsilon_n$" in the predetermined ranges.

The strain sensing coefficient $T_{\varepsilon/KL}$ is a parameter calculated based on "strain relaxation coefficient $T_{\varepsilon/K}$" and "microbend loss sensitivity $L_{micro}$". Hereinafter, a method of each of the parameters will be described.

(Strain Relaxation Coefficient $T_{\varepsilon/K}$)

The strain relaxation coefficient $T_{\varepsilon/K}$ is a parameter calculated using a lateral pressure $P_f$ [Pa], a strain $\varepsilon$, a holding time $T_w$ [hour], a strain holding time $T_\varepsilon$ [hour], a coating coefficient $K_{coat}$, and the like.

Here, "the lateral pressure $P_f$" is a lateral pressure applied to the optical fiber and is calculated based on the winding tension, the winding thickness, and the like. "The strain $\varepsilon$" is calculated based on the Young's modulus $E_p$ [Pa] of a layer having the lowest Young's modulus among the coating layers. The strain $\varepsilon$ is a numerical value indicating the degree to which the coating layer is deformed by the lateral pressure. $E_p$ is typically the Young's modulus of the primary layer.

"The holding time $T_w$" is a period of time from the start of the winding of the optical fiber around the bobbin until the drawing of the optical fiber from the bobbin ends. That is, the holding time $T_w$ is a total period of time during which the state where the optical fiber is wound around the bobbin is held. "The strain holding time $T_\varepsilon$" is calculated based on the strain $\varepsilon$ and the holding time $T_w$. The strain holding time $T_\varepsilon$ is a numerical value indicating the likeliness that the deformation of the coating remains. "The coating coefficient $K_{coat}$" is a numerical value indicating that the magnitude of an external force applied to the bare optical fiber based on physical properties of the coating layer.

Hereinafter, a specific method of calculating the strain relaxation coefficient $T_{\varepsilon/K}$ will be described.

$P_f$ is defined by the following Expression (1). Here, F [N] represents the winding tension, h [m] represents the winding thickness, D [m] represents the barrel diameter of the bobbin, and d [m] represents the outer diameter of the optical fiber.

$$P_f = \frac{2Fh}{(D+d+2\times 2h/3)\times d^2} \quad (1)$$

The strain $\varepsilon$ is calculated as $\varepsilon = P_f/E_p$ based on $P_f$ and $E_p$ [Pa] described above.

The strain holding time $T_\varepsilon$ is the product of the holding time $T_w$ and the strain $\varepsilon$. That is, $T_\varepsilon = \varepsilon \times T_w$.

The coating coefficient $K_{coat}$ is calculated from the following Expression (2). The coating coefficient $K_{coat}$ is disclosed in Baldauf et al, IEICE Vol. E76-B, No. 4 Apr. 1993. In Expression (2), $t_p$ [m] represents the thickness of the primary layer, $E_s$ [Pa] represents the Young's modulus of the secondary layer, $t_s$ [m] represents the thickness of the secondary layer, $R_s$ [m] represents the outer diameter of the coating, $H_0$ represents a secondary rigidity (refer to Expression (3)), and $\mu$ represents a bobbin surface coefficient. By adjusting these parameters, the coating coefficient $K_{coat}$ can be adjusted. In a case where the coating is formed of one layer, $E_p = E_s$ is satisfied.

$$K_{coat} = \frac{(E_p/t_p)^2 \cdot 10^{-19}}{H_0^{0.25\mu - 0.125}\left(E_p + \frac{t_s^3}{R_s^3}E_s\right)^{1.125 - 0.25\mu}} \quad (2)$$

In addition, the secondary rigidity $H_0$ in Expression (2) is obtained from the following Expression (3). In Expression (3), $r_p$ [m] represents the outer diameter of the primary layer, and $r_s$ [m] represents the outer diameter of the secondary layer. In a case where the coating is formed of one layer, $r_s$ represents the outer diameter of the coating, and $r_p$ represents the outer diameter of the bare optical fiber.

$$H_0 = \frac{\pi}{4}E_s(r_s^4 - r_p^4) \quad (3)$$

The strain relaxation coefficient $T_{\varepsilon/K}$ is calculated from the following Expression (4) using the strain holding time $T_\varepsilon$ and the coating coefficient $K_{coat}$.

$$T_{\varepsilon/K} = T_\varepsilon/K_{coat} \times 10^3 = \varepsilon \times T_w/K_{coat} \times 10^3 \quad (4)$$

(Microbend Loss Sensitivity $L_{micro}$)

The microbend loss sensitivity $L_{micro}$ is a parameter defined by the following Expression (5). In Expression (5), $\Delta\beta$ [rad/m] is a difference between a propagation constant $\beta_{01}$ [rad/m] of a fundamental mode propagating in the optical fiber and a propagation constant $\beta_{11}$ [rad/m] of a next higher mode. In general, $\Delta\beta$ is a value higher than 8000. Accordingly, in general, the value of the microbend loss sensitivity $L_{micro}$ is a positive value.

$$L_{micro} = \frac{(\Delta\beta - 8000)}{3000} \quad (5)$$

(Strain Sensing Coefficient $T_{\varepsilon/KL}$)

The strain sensing coefficient $T_{\varepsilon/KL}$ is a ratio of "the strain relaxation coefficient $T_{\varepsilon/K}$" to "the microbend loss sensitivity $L_{micro}$". That is, the strain sensing coefficient $T_{\varepsilon/KL}$ is a parameter calculated from the following Expression (6).

In general, the value of the microbend loss sensitivity $L_{micro}$ is a positive value. Therefore, the value of the strain sensing coefficient $T_{\varepsilon/KL}$ is higher than 0.

$$T_{\varepsilon/KL} = \frac{T_\varepsilon}{K_{coat} \cdot L_{micro}} = \varepsilon \times \frac{T_w}{K_{coat} \cdot L_{micoro}} \times 10^3 \quad (6)$$

Expression (6) can also be expressed by the following Expression (7).

$$T_{\varepsilon/KL} = \frac{2Fh}{(D+d+2\times 2h/3)\times d^2} \times \frac{T_w}{E_P} \times \frac{1}{K_{coat}} \times \frac{3000 \times 10^3}{(\Delta\beta - 8000)} \quad (7)$$

Although the details will be described below, by adjusting the strain sensing coefficient $T_{\varepsilon/KL}$ to 973 or lower, the phenomenon in which a loss of the optical fiber in the temperature characteristic test at −60° C. increases can be prevented. In addition, even in a case where deformation occurs by the lateral pressure being applied to the coating layer, the coating layer can return to a shape before the deformation in each of subsequent steps for winding around the shipping bobbin or for formation of a cable. As a result, microbend characteristics of the optical fiber in a low-temperature environment can be maintained well.

Here, in order to reduce the strain sensing coefficient $T_{\varepsilon/KL}$, it can be considered to increase the Young's modulus $E_p$ of the primary layer or to reduce the winding thickness h or the strain holding time $T_\varepsilon$. However, in a case where the Young's modulus $E_p$ of the primary layer increases, microbend characteristic deteriorate. In addition, in a case where the winding thickness h or the strain holding time $T_\varepsilon$ decreases, the length of the optical fiber that can be wound around one bobbin is reduced, which leads to a decrease in manufacturing efficiency.

In consideration of the above factors, it can be considered to reduce the winding tension F in order to reduce the strain sensing coefficient $T_{\varepsilon/KL}$. However, in a case where the winding tension F decreases, winding collapse or winding come-out is more likely to occur. The winding collapse refers to a phenomenon in which a layer formed by winding the optical fiber collapses. The winding come-out refers to a phenomenon in which the optical fiber is loosened and a loop of the optical fiber pokes out from the layer.

As a result of a thorough investigation on conditions where winding collapse or winding come-out does not occur, it was found that appropriate winding conditions can be obtained by adjusting the following "one-layer strain $\varepsilon_n$" to be in a predetermined range.

(One-Layer Strain $\varepsilon_n$)

The one-layer strain $\varepsilon_n$ is a parameter calculated based on "winding stress $P_n$" of each layer (each traverse, that is, each layer of the optical fiber wound with the same winding thickness h) of the optical fiber wound around the bobbin and $E_p$ described above.

The winding stress $P_n$ is calculated from the following Expression (8). In Expression (8), $D_f$ [m] represents the winding diameter when the optical fiber is wound around the bobbin, and d [m] represents the outer diameter of the optical fiber. Regarding the optical fiber of the lowermost layer wound around the bobbin, $D_f$=D. Regarding the optical fiber of the uppermost layer, $D_f$=D+2×h.

$$P_n = \frac{2F}{(D_f + d) \times d} \quad (8)$$

The one-layer strain $\varepsilon_n$ is calculated from $\varepsilon_n = P_n/E_p$ using the winding stress $P_n$.

As a result, the one-layer strain $\varepsilon_n$ is defined by the following Expression (9).

$$\varepsilon_n = \frac{2F}{(D_f + d) \times d} \times \frac{1}{E_p} \quad (9)$$

Although the details will be described below, by setting the one-layer strain $\varepsilon_n$ defined as described above to 0.01 or higher, and setting a winding pressure to certainly deform the coating material, winding collapse or winding come-out caused when the optical fiber is wound around the bobbin can be prevented. The value of the one-layer strain $\varepsilon_n$ varies because the winding diameter $D_f$ of each layer of the optical fiber wound around the bobbin varies. As the position of the layer increases, the value of the one-layer strain $\varepsilon_n$ decreases. As the position of the layer becomes lower, the value of the one-layer strain $\varepsilon_n$ increases. Accordingly, in a case where the one-layer strain $\varepsilon_n$ of the optical fiber of the uppermost layer is 0.01 or higher, the one-layer strain $\varepsilon_n$ of the optical fiber as a whole wound around the bobbin is 0.01 or higher.

EXAMPLES

Hereinafter, embodiments will be described using specific Examples shown in Tables 1 and 2. The following Examples do not limit the embodiments of the present invention.

Table 2 shows the result of the temperature characteristic test in which the optical fiber of the lowermost layer was in the free coil state. In a case where a loss increase phenomenon at −60° C. did not occur, "OK (good)" is shown in "Temperature Characteristic Test". In a case where a loss increase phenomenon occurred, "NG (bad)" is shown in "Temperature Characteristic Test". In a case where winding collapse did not occur during winding around the bobbin and during rewinding around the bobbin, "OK (good)" is shown in "Winding Collapse". In a case where winding collapse occurred during winding around the bobbin and during rewinding around the bobbin, "NG (bad)" is shown in "Winding Collapse".

TABLE 1

|  | Drawing Rate [m/min] | Winding Length [km] | Winding Time [hour] | Storage Time [hour] | Holding Time $T_w$ [hour] | Winding Tension F [gf] | Barrel Diameter D [mm] |
|---|---|---|---|---|---|---|---|
| Example 1 | 2000 | 2000 | 33.3 | 6.7 | 40 | 100 | 450 |
| Example 2 | 2000 | 2000 | 33.3 | 86.7 | 120 | 100 | 450 |
| Comparative Example 1 | 2000 | 2000 | 33.3 | 96.7 | 130 | 100 | 450 |
| Example 3 | 2000 | 2000 | 33.3 | 66.7 | 100 | 120 | 450 |
| Comparative Example 2 | 2000 | 2000 | 33.3 | 76.7 | 110 | 120 | 450 |
| Example 4 | 2000 | 2000 | 33.3 | 31.7 | 65 | 100 | 450 |
| Comparative Example 3 | 2000 | 2000 | 33.3 | 36.7 | 70 | 100 | 450 |
| Example 5 | 2000 | 2000 | 33.3 | 6.7 | 40 | 70 | 450 |
| Comparative Example 4 | 2000 | 2000 | 33.3 | 6.7 | 40 | 60 | 450 |
| Example 6 | 2000 | 2000 | 33.3 | 6.7 | 40 | 70 | 450 |
| Comparative Example 5 | 2000 | 2000 | 33.3 | 6.7 | 40 | 75 | 450 |
| Example 7 | 2000 | 2000 | 33.3 | 6.7 | 40 | 70 | 450 |

TABLE 1-continued

| | | | | | | | |
|---|---|---|---|---|---|---|---|
| Example 8 | 2000 | 2000 | 33.3 | 6.7 | 40 | 60 | 450 |
| Example 9 | 2000 | 2000 | 33.3 | 6.7 | 40 | 50 | 450 |
| Comparative Example 6 | 2000 | 2000 | 33.3 | 6.7 | 40 | 50 | 450 |
| Example 10 | 2000 | 2000 | 33.3 | 6.7 | 40 | 100 | 450 |
| Comparative Example 7 | 2000 | 2000 | 33.3 | 6.7 | 40 | 110 | 450 |

| | Winding Thickness h [mm] | Young's Modulus $E_p$ of Primary Layer [MPa] | Young's Modulus $E_p$ of Secondary Layer [MPa] | Outer Diameter of Bare Optical Fiber [μm] | Outer Diameter $r_p$ of Primary Layer [μm] | Outer Diameter $r_s$ of Secondary Layer [μm] |
|---|---|---|---|---|---|---|
| Example 1 | 50 | 1 | 1000 | 125 | 200 | 250 |
| Example 2 | 50 | 1 | 1000 | 125 | 200 | 250 |
| Comparative Example 1 | 50 | 1 | 1000 | 125 | 200 | 250 |
| Example 3 | 50 | 1 | 1000 | 125 | 200 | 250 |
| Comparative Example 2 | 50 | 1 | 1000 | 125 | 200 | 250 |
| Example 4 | 100 | 1 | 1000 | 125 | 200 | 250 |
| Comparative Example 3 | 100 | 1 | 1000 | 125 | 200 | 250 |
| Example 5 | 50 | 1 | 1000 | 125 | 200 | 250 |
| Comparative Example 4 | 50 | 1 | 1000 | 125 | 200 | 250 |
| Example 6 | 50 | 0.6 | 1000 | 125 | 200 | 250 |
| Comparative Example 5 | 50 | 0.6 | 1000 | 125 | 200 | 250 |
| Example 7 | 50 | 0.6 | 800 | 125 | 200 | 250 |
| Example 8 | 50 | 0.6 | 800 | 125 | 180 | 230 |
| Example 9 | 30 | 0.4 | 800 | 125 | 180 | 230 |
| Comparative Example 6 | 35 | 0.4 | 800 | 125 | 180 | 230 |
| Example 10 | 50 | 0.5 | 1000 | 125 | 200 | 250 |
| Comparative Example 7 | 50 | 0.5 | 1000 | 125 | 200 | 250 |

TABLE 2

| | Coating Coefficient $K_{coef}$ | Strain Relaxation Coefficient $T_{\varepsilon/K}$ | Δβ [rad/m] | Strain Sensing Coefficient $T_{\varepsilon/KL}$ | One-Layer Strain $\varepsilon_n$ (Lowermost Layer) | One-Layer Strain $\varepsilon_n$ (Uppermost Layer) | Temperature Characteristic Test | Winding Collapse |
|---|---|---|---|---|---|---|---|---|
| Example 1 | 1,196 | 101 | 9300 | 312 | 0.017 | 0.014 | OK | OK |
| Example 2 | 1,196 | 304 | 9300 | 936 | 0.017 | 0.014 | OK | OK |
| Comparative Example 1 | 1,196 | 329.66 | 9300 | 1014 | 0.017 | 0.014 | NG | OK |
| Example 3 | 1,196 | 304.30 | 9300 | 936 | 0.021 | 0.017 | OK | OK |
| Comparative Example 2 | 1,196 | 334.73 | 9300 | 1030 | 0.021 | 0.017 | NG | OK |
| Example 4 | 1,196 | 292.00 | 9200 | 973 | 0.017 | 0.012 | OK | OK |
| Comparative Example 3 | 1,196 | 314.46 | 9200 | 1048 | 0.017 | 0.012 | NG | OK |
| Example 5 | 1,196 | 71.00 | 9400 | 203 | 0.012 | 0.010 | OK | OK |
| Comparative Example 4 | 1,196 | 60.86 | 9400 | 174 | 0.010 | 0.009 | OK | NG |
| Example 6 | 468 | 302.33 | 9250 | 967 | 0.020 | 0.017 | OK | OK |
| Comparative Example 5 | 468 | 323.93 | 9250 | 1037 | 0.022 | 0.018 | NG | OK |
| Example 7 | 566 | 250.13 | 9400 | 715 | 0.020 | 0.017 | OK | OK |
| Example 8 | 1,182 | 121.24 | 9400 | 346 | 0.019 | 0.015 | OK | OK |
| Example 9 | 552 | 205.37 | 8900 | 913 | 0.024 | 0.021 | OK | OK |
| Comparative Example 6 | 552 | 236.39 | 8900 | 1051 | 0.024 | 0.020 | NG | OK |
| Example 10 | 333 | 728.48 | 11000 | 971 | 0.035 | 0.028 | OK | OK |
| Comparative Example 7 | 333 | 801.33 | 11000 | 1068 | 0.038 | 0.031 | NG | OK |

Example 1

Using a large optical fiber preform M having Δβ of 9300 rad/m, an optical fiber having a total length of 2000 km was manufactured at a drawing rate of 2000 m/min and was wound around the winding bobbin 7. That is, "Winding Length (refer to Table 1)" of the optical fiber wound around the winding bobbin 7 was 2000 km. Regarding the Young's modulus of the coating material used at this time, $E_p$ of the primary layer was 1.0 MPa, and $E_s$ of the secondary layer was 1000 MPa. The outer diameter of the bare optical fiber was φ 125 μm, the outer diameter $r_p$ of the primary layer was φ 200 μm, and the outer diameter $r_s$ of the secondary layer was φ 250 μm. The winding conditions were a winding tension F of 100 gf and a winding thickness h of 50 mm. The barrel diameter D of the winding bobbin was φ 450 mm. The material of the winding bobbin 7 was aluminum. In this case, the bobbin surface coefficient μ was 3. The "Winding Time (refer to Table 1)" from the start of drawing to the end of drawing was 33.3 hours. In addition, "Storage Time (refer to Table 1)" from the end of drawing to the end of rewinding in the subsequent step was 6.7 hours. That is, the holding time $T_w$ from the start of drawing to the end of rewinding in the subsequent step was 40 hours.

As a result, the coating coefficient $K_{coat}$ was 1196, and the strain sensing coefficient $T_{\varepsilon/KL}$ was 312. In addition, the one-layer strain $\varepsilon_n$ was 0.017 in the bobbin lowermost layer ($D_f$: φ 450 mm) and was 0.014 in the bobbin uppermost layer ($D_f$: φ 550 mm).

Under the above-described conditions, winding collapse did not occur during winding around the bobbin or during rewinding around the bobbin. In addition, even in a temperature characteristic test in which the optical fiber of the lowermost layer was in the free coil state, a loss increase phenomenon at −60° C. did not occur, and the results were good (refer to FIG. 2).

Example 2

Using a large optical fiber preform M having Δβ of 9300 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 1.0 MPa, and $E_s$ of the secondary layer was 1000 MPa. The outer diameter of the bare optical fiber was φ 125 μm, the outer diameter $r_p$ of the primary layer was φ 200 μm, and the outer diameter $r_s$, of the secondary layer was φ 250 μm. The winding conditions were a winding tension F of 100 gf and a winding thickness h of 50 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 120 hours.

As a result, the coating coefficient $K_{coat}$ was 1196, and the strain sensing coefficient $T_{\varepsilon/KL}$ was 936. In addition, the one-layer strain $\varepsilon_n$ was 0.017 in the bobbin lowermost layer ($D_f$: φ 450 mm) and was 0.014 in the bobbin uppermost layer ($D_f$: φ 550 mm).

Under the above-described conditions, winding collapse did not occur during winding around the bobbin or during rewinding around the bobbin. In addition, even in a temperature characteristic test in which the optical fiber of the lowermost layer was in the free coil state, a loss increase phenomenon at −60° C. did not occur, and the results were good (refer to FIG. 2).

Comparative Example 1

Using a large optical fiber preform M having Δβ of 9300 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 1.0 MPa, and $E_s$ of the secondary layer was 1000 MPa. The outer diameter of the bare optical fiber was φ 125 μm, the outer diameter $r_p$ of the primary layer was φ 200 μm, and the outer diameter $r_s$ of the secondary layer was φ 250 μm. The winding conditions were a winding tension F of 100 gf and a winding thickness h of 50 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 130 hours.

As a result, the coating coefficient $K_{coat}$ was 1196, and the strain sensing coefficient $T_{\varepsilon/KL}$ was 1014. In addition, the one-layer strain $\varepsilon_n$ was 0.017 in the bobbin lowermost layer ($D_f$: φ 450 mm) and was 0.014 in the bobbin uppermost layer ($D_f$: φ 550 mm).

Under the above-described conditions, winding collapse did not occur during winding around the bobbin or during rewinding around the bobbin. However, in the temperature characteristic test in which the optical fiber of the lowermost layer was in the free coil state, a loss increase phenomenon at −60° C. occurred (refer to FIG. 3).

Example 3

Using a large optical fiber preform M having Δβ of 9300 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 1.0 MPa, and $E_s$ of the secondary layer was 1000 MPa. The outer diameter of the bare optical fiber was φ 125 μm, the outer diameter $r_p$ of the primary layer was φ 200 μm, and the outer diameter $r_s$ of the secondary layer was φ 250 μm. The winding conditions were a winding tension F of 120 gf and a winding thickness h of 50 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 100 hours.

As a result, the coating coefficient $K_{coat}$ was 1196, and the strain sensing coefficient $T_{\varepsilon/KL}$ was 936. In addition, the one-layer strain $\varepsilon_n$ was 0.021 in the bobbin lowermost layer ($D_f$: φ 450 mm) and was 0.017 in the bobbin uppermost layer ($D_f$: φ 550 mm).

Under the above-described conditions, winding collapse did not occur during winding around the bobbin or during rewinding around the bobbin. In addition, even in a temperature characteristic test in which the optical fiber of the lowermost layer was in the free coil state, a loss increase phenomenon at −60° C. did not occur, and the results were good (refer to FIG. 2).

Comparative Example 2

Using a large optical fiber preform M having Δβ of 9300 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 1.0 MPa, and $E_s$ of the secondary layer was 1000 MPa. The outer diameter of the bare optical fiber was φ 125 μm, the outer diameter $r_p$ of the primary layer was φ 200 μm, and the outer diameter $r_s$ of the secondary layer was φ 250 μm. The winding conditions were a winding tension F of 120 gf and a winding thickness h of 50 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 110 hours.

As a result, the coating coefficient $K_{coat}$ was 1196, and the strain sensing coefficient $T_{ε/KL}$ was 1030. In addition, the one-layer strain $ε_n$ was 0.021 in the bobbin lowermost layer ($D_f$: φ 450 mm) and was 0.017 in the bobbin uppermost layer ($D_f$: φ 550 mm).

Under the above-described conditions, winding collapse did not occur during winding around the bobbin or during rewinding around the bobbin. However, in the temperature characteristic test in which the optical fiber of the lowermost layer was in the free coil state, a loss increase phenomenon at −60° C. occurred (refer to FIG. 3).

Example 4

Using a large optical fiber preform M having Δβ of 9200 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 1.0 MPa, and $E_s$ of the secondary layer was 1000 MPa. The outer diameter of the bare optical fiber was φ 125 μm, the outer diameter $r_p$ of the primary layer was φ 200 μm, and the outer diameter $r_s$ of the secondary layer was φ 250 μm. The winding conditions were a winding tension F of 100 gf and a winding thickness h of 100 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 65 hours.

As a result, the coating coefficient $K_{coat}$ was 1196, and the strain sensing coefficient $T_{ε/KL}$ was 973. In addition, the one-layer strain $ε_n$ was 0.017 in the bobbin lowermost layer ($D_f$: φ 450 mm) and was 0.012 in the bobbin uppermost layer ($D_f$: φ 650 mm).

Under the above-described conditions, winding collapse did not occur during winding around the bobbin or during rewinding around the bobbin. In addition, even in a temperature characteristic test in which the optical fiber of the lowermost layer was in the free coil state, a loss increase phenomenon at −60° C. did not occur, and the results were good (refer to FIG. 2).

Comparative Example 3

Using a large optical fiber preform M having Δβ of 9200 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 1.0 MPa, and $E_s$ of the secondary layer was 1000 MPa. The outer diameter of the bare optical fiber was φ 125 μm, the outer diameter $r_p$ of the primary layer was φ 200 μm, and the outer diameter $r_s$ of the secondary layer was φ 250 μm. The winding conditions were a winding tension F of 100 gf and a winding thickness h of 100 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 70 hours.

As a result, the coating coefficient $K_{coat}$ was 1196, and the strain sensing coefficient $T_{ε/KL}$ was 1048. In addition, the one-layer strain $ε_n$ was 0.017 in the bobbin lowermost layer ($D_f$: φ 450 mm) and was 0.012 in the bobbin uppermost layer ($D_f$: φ 650 mm).

Under the above-described conditions, winding collapse did not occur during winding around the bobbin or during rewinding around the bobbin. However, in the temperature characteristic test in which the optical fiber of the lowermost layer was in the free coil state, a loss increase phenomenon at −60° C. occurred (refer to FIG. 3).

Example 5

Using a large optical fiber preform M having Δβ of 9400 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 1.0 MPa, and $E_s$ of the secondary layer was 1000 MPa. The outer diameter of the bare optical fiber was φ 125 μm, the outer diameter $r_p$ of the primary layer was φ 200 μm, and the outer diameter $r_s$ of the secondary layer was φ 250 μm. The winding conditions were a winding tension F of 70 gf and a winding thickness h of 50 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 40 hours.

As a result, the coating coefficient $K_{coat}$ was 1196, and the strain sensing coefficient $T_{ε/KL}$ was 203. In addition, the one-layer strain $ε_n$ was 0.012 in the bobbin lowermost layer ($D_f$: φ 450 mm) and was 0.010 in the bobbin uppermost layer ($D_f$: φ 550 mm).

Under the above-described conditions, winding collapse did not occur during winding around the bobbin or during rewinding around the bobbin. In addition, even in a temperature characteristic test in which the optical fiber of the lowermost layer was in the free coil state, a loss increase phenomenon at −60° C. did not occur, and the results were good (refer to FIG. 2).

Comparative Example 4

Using a large optical fiber preform M having Δβ of 9400 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 1.0 MPa, and $E_s$ of the secondary layer was 1000 MPa. The outer diameter of the bare optical fiber was φ 125 μm, the outer diameter $r_p$ of the primary layer was φ 200 μm, and the outer diameter $r_s$ of the secondary layer was φ 250 μm. The winding conditions were a winding tension F of 60 gf and a winding thickness h of 50 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 40 hours.

As a result, the coating coefficient $K_{coat}$ was 1196, and the strain sensing coefficient $T_{\varepsilon/KL}$, was 174. In addition, the one-layer strain $\varepsilon_n$ was 0.010 in the bobbin lowermost layer ($D_f$: φ 450 mm) and was 0.009 in the bobbin uppermost layer ($D_f$: φ 550 mm).

Under the above-described conditions, winding collapse occurred during winding around the bobbin, and the wound optical fiber as a whole is damaged.

Example 6

Using a large optical fiber preform M having Δβ of 9250 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 0.6 MPa, and $E_s$ of the secondary layer was 1000 MPa. The outer diameter of the bare optical fiber was φ 125 μm, the outer diameter $r_p$ of the primary layer was φ 200 μm, and the outer diameter $r_s$ of the secondary layer was φ 250 μm. The winding conditions were a winding tension F of 70 gf and a winding thickness h of 50 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 40 hours.

As a result, the coating coefficient $K_{coat}$ was 468, and the strain sensing coefficient $T_{\varepsilon/KL}$ was 967.

In addition, the one-layer strain $\varepsilon_n$ was 0.020 in the bobbin lowermost layer ($D_f$: φ 450 mm) and was 0.017 in the bobbin uppermost layer ($D_f$: φ 550 mm).

Under the above-described conditions, winding collapse did not occur during winding around the bobbin or during rewinding around the bobbin. In addition, even in a temperature characteristic test in which the optical fiber of the lowermost layer was in the free coil state, a loss increase phenomenon at −60° C. did not occur, and the results were good (refer to FIG. 2).

Comparative Example 5

Using a large optical fiber preform M having Δβ of 9250 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 0.6 MPa, and $E_s$ of the secondary layer was 1000 MPa. The outer diameter of the bare optical fiber was φ 125 μm, the outer diameter $r_p$ of the primary layer was φ 200 μm, and the outer diameter $r_s$ of the secondary layer was φ 250 μm. The winding conditions were a winding tension F of 75 gf and a winding thickness h of 50 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 40 hours.

As a result, the coating coefficient $K_{coat}$ was 468, and the strain sensing coefficient $T_{\varepsilon/KL}$ was 1037. In addition, the one-layer strain $\varepsilon_n$ was 0.022 in the bobbin lowermost layer ($D_f$: φ 450 mm) and was 0.018 in the bobbin uppermost layer ($D_f$: φ 550 mm).

Under the above-described conditions, winding collapse did not occur during winding around the bobbin or during rewinding around the bobbin. However, in the temperature characteristic test in which the optical fiber of the lowermost layer was in the free coil state, a loss increase phenomenon at −60° C. occurred (refer to FIG. 3).

Example 7

Using a large optical fiber preform M having Δβ of 9400 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 0.6 MPa, and $E_s$ of the secondary layer was 800 MPa. The outer diameter of the bare optical fiber was φ 125 μm, the outer diameter $r_p$ of the primary layer was φ 200 μm, and the outer diameter $r_s$ of the secondary layer was φ 250 μm. The winding conditions were a winding tension F of 70 gf and a winding thickness h of 50 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 40 hours.

As a result, the coating coefficient $K_{coat}$ was 566, and the strain sensing coefficient $T_{\varepsilon/KL}$ was 715. In addition, the one-layer strain $\varepsilon_n$ was 0.020 in the bobbin lowermost layer ($D_f$: φ 450 mm) and was 0.017 in the bobbin uppermost layer ($D_f$: φ 550 mm).

Under the above-described conditions, winding collapse did not occur during winding around the bobbin or during rewinding around the bobbin. In addition, even in a temperature characteristic test in which the optical fiber of the lowermost layer was in the free coil state, a loss increase phenomenon at −60° C. did not occur, and the results were good (refer to FIG. 2).

Example 8

Using a large optical fiber preform M having Δβ of 9400 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 0.6 MPa, and $E_s$ of the secondary layer was 800 MPa. The outer diameter of the bare optical fiber was φ 125 μm, the outer diameter $r_p$ of the primary layer was φ 180 μm, and the outer diameter $r_s$ of the secondary layer was φ 230 μm. The winding conditions were a winding tension F of 60 gf and a winding thickness h of 50 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 40 hours.

As a result, the coating coefficient $K_{coat}$ was 1182, and the strain sensing coefficient $T_{\varepsilon/KL}$ was 346. In addition, the one-layer strain $\varepsilon_n$ was 0.019 in the bobbin lowermost layer ($D_f$: φ 450 mm) and was 0.015 in the bobbin uppermost layer ($D_f$: φ 550 mm).

Under the above-described conditions, winding collapse did not occur during winding around the bobbin or during rewinding around the bobbin. In addition, even in a temperature characteristic test in which the optical fiber of the lowermost layer was in the free coil state, a loss increase phenomenon at −60° C. did not occur, and the results were good (refer to FIG. 2).

Example 9

Using a large optical fiber preform M having Δβ of 8900 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 0.4 MPa, and $E_s$ of the secondary layer was 800 MPa. The outer diameter of the bare optical fiber was 125 μm, the outer diameter $r_p$ of the primary layer was φ 180 μm, and the outer diameter $r_s$ of the secondary layer was φ 230 μm. The winding conditions were a winding tension F of 50 gf and a winding thickness h of 30 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 40 hours.

As a result, the coating coefficient $K_{coat}$ was 552, and the strain sensing coefficient $T_{\varepsilon/KL}$ was 913. In addition, the one-layer strain $\varepsilon_n$ was 0.024 in the bobbin lowermost layer ($D_f$: φ 450 mm) and was 0.021 in the bobbin uppermost layer ($D_f$: φ 510 mm).

Under the above-described conditions, winding collapse did not occur during winding around the bobbin or during rewinding around the bobbin. In addition, even in a temperature characteristic test in which the optical fiber of the lowermost layer was in the free coil state, a loss increase phenomenon at −60° C. did not occur, and the results were good (refer to FIG. 2).

Comparative Example 6

Using a large optical fiber preform M having Δβ of 8900 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 0.4 MPa, and $E_s$ of the secondary layer was 800 MPa. The outer diameter of the bare optical fiber was φ 125 μm, the outer diameter $r_p$ of the primary layer was φ 180 μm, and the outer diameter $r_s$ of the secondary layer was φ 230 μm. The winding conditions were a winding tension F of 50 gf and a winding thickness h of 35 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 40 hours.

As a result, the coating coefficient $K_{coat}$ was 552, and the strain sensing coefficient $T_{\varepsilon/KL}$ was 1051. In addition, the one-layer strain $\varepsilon_n$ was 0.024 in the bobbin lowermost layer ($D_f$: φ 450 mm) and was 0.020 in the bobbin uppermost layer ($D_f$: φ 520 mm).

Under the above-described conditions, winding collapse did not occur during winding around the bobbin or during rewinding around the bobbin. However, in the temperature characteristic test in which the optical fiber of the lowermost layer was in the free coil state, a loss increase phenomenon at −60° C. occurred (refer to FIG. 3).

Example 10

Using a large optical fiber preform M having Δβ of 11000 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 0.5 MPa, and $E_s$ of the secondary layer was 1000 MPa. The outer diameter of the bare optical fiber was φ 125 μm, the outer diameter $r_p$ of the primary layer was φ 200 μm, and the outer diameter $r_s$ of the secondary layer was φ 250 μm. The winding conditions were a winding tension F of 100 gf and a winding thickness h of 50 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 40 hours.

As a result, the coating coefficient $K_{coat}$ was 333, and the strain sensing coefficient $T_{\varepsilon/KL}$ was 971.

In addition, the one-layer strain $\varepsilon_n$ was 0.035 in the bobbin lowermost layer ($D_f$: φ 450 mm) and was 0.028 in the bobbin uppermost layer ($D_f$: φ 550 mm).

Under the above-described conditions, winding collapse did not occur during winding around the bobbin or during rewinding around the bobbin. In addition, even in a temperature characteristic test in which the optical fiber of the lowermost layer was in the free coil state, a loss increase phenomenon at −60° C. did not occur, and the results were good (refer to FIG. 2).

Comparative Example 7

Using a large optical fiber preform M having Δβ of 11000 rad/m, an optical fiber having a total length of 2000 km was manufactured at a drawing rate of 2000 m/min and was wound around the winding bobbin 7. Regarding the Young's modulus of the coating material used at this time, $E_p$ of the primary layer was 0.5 MPa, and $E_s$ of the secondary layer was 1000 MPa. The outer diameter of the bare optical fiber was φ 125 μm, the outer diameter $r_p$ of the primary layer was φ 200 μm, and the outer diameter $r_s$ of the secondary layer was φ 250 μm. The winding conditions were a winding tension F of 110 gf and a winding thickness h of 50 mm. The barrel diameter D of the winding bobbin was φ 450 mm. The material of the winding bobbin 7 was aluminum. In this case, the bobbin surface coefficient μ was 3. The holding time $T_w$ from the start of drawing to the end of rewinding in the subsequent step was 40 hours.

As a result, the coating coefficient $K_{coat}$ was 333, and the strain sensing coefficient $T_{\varepsilon/KL}$ was 1068. In addition, the one-layer strain $\varepsilon_n$ was 0.038 in the bobbin lowermost layer ($D_f$: φ 450 mm) and was 0.031 in the bobbin uppermost layer ($D_f$: φ 550 mm).

Under the above-described conditions, winding collapse did not occur during winding around the bobbin or during rewinding around the bobbin. However, in the temperature characteristic test in which the optical fiber of the lowermost layer was in the free coil state, a loss increase phenomenon at −60° C. occurred (refer to FIG. 3).

As shown in Examples 1 to 10 and Comparative Examples 1 to 7, by adjusting the Young's modulus $E_p$ of the primary layer, the Young's modulus $E_s$ of the secondary layer, the outer diameter of the bare optical fiber, the outer diameter $r_p$ of the primary layer, the outer diameter $r_s$ of the secondary layer, and the like, the coating coefficient $K_{coat}$ can be adjusted. Further, by adjusting the holding time $T_w$, the winding tension F, the winding thickness h, the barrel diameter D of the winding bobbin 7, and the like, the strain sensing coefficient $T_{\varepsilon/KL}$ can be adjusted.

Focusing on the result of the temperature characteristic test, in a case where the strain sensing coefficient $T_{\varepsilon/KL}$ is 973 or lower (refer to Example 4 and the like), the results were good. On the other hand, in a case where the strain sensing coefficient $T_{\varepsilon/KL}$ is 1014 or higher (refer to Comparative Example 1 and the like), the results were not good. It can be seen from the above result that, by adjusting the strain sensing coefficient $T_{\varepsilon/KL}$ to higher than 0 and 973 or lower, the optical fiber can be obtained in which the deformation of the coating layer is suppressed and the result of the temperature characteristic test is good.

In addition, by adjusting the winding diameter $D_f$ calculated based on the barrel diameter D and the winding thickness h, the winding tension F, the Young's modulus $E_p$ of the primary layer, and the like, the one-layer strain $\varepsilon_n$ can be adjusted.

Focusing on whether or not winding collapse occurred, in Comparative Example 4 in which the one-layer strain $\varepsilon_n$ of the uppermost layer was 0.009, winding collapse occurred. On the other hand, in a case where the one-layer strain $\varepsilon_n$ of the uppermost layer was 0.010 or higher, winding collapse did not occur. It can be seen from the above result that, by adjusting the one-layer strain $\varepsilon_n$ to be 0.010 or higher, winding collapse during winding around the bobbin can be suppressed.

As described in one or more embodiments above, by adjusting the strain sensing coefficient $T_{\varepsilon/KL}$ and the one-layer strain $\varepsilon_n$ to be appropriate values, the optical fiber can be obtained in which winding collapse during winding around the bobbin does not occur, the deformation of the coating layer is suppressed, and the result of the temperature characteristic test is good. In addition, the above-described conditions are set in consideration of the parameters such as the Young's modulus of the coating layer, the coating diameter, the performance (Δβ) of the optical fiber, and the like, and have extremely high versatility. Therefore, the above-described conditions are particularly advantageous in that they can be flexibly applied for a change in coating material or the design of the optical fiber in the future.

In particular, by setting at least one condition of the winding tension F, the winding thickness h, and the holding time $T_w$ such that the strain sensing coefficient $T_{\varepsilon/KL}$ is higher than 0 and 973 or lower, the above-described optimum winding conditions can be easily set.

In addition, by setting at least one of the outer diameter $r_p$ of the primary layer and the outer diameter $r_s$ of the secondary layer such that the strain sensing coefficient $T_{\varepsilon/KL}$ is higher than 0 and 973 or lower, the above-described optimum winding conditions can be easily set.

In addition, by setting the winding tension F such that the one-layer strain $\varepsilon_n$ is 0.01 or higher, the above-described optimum winding conditions can be easily set.

The technical scope of the present invention is not limited to the above embodiments, and various modifications can be made within a range not departing from the scope of the present invention.

In addition, within a range not departing from the scope of the present invention, the components according to the above embodiments can be appropriately replaced with well-known components, and the above embodiments may be appropriately combined with modification examples.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, embodiments of the invention are not to be considered as being limited by the foregoing description, and are only limited by the scope of the appended claims.

What is claimed is:

1. A method of manufacturing an optical fiber in which a coating is provided on a bare optical fiber, the method comprising:
   tensioning the optical fiber with a winding tension F[N]; and
   winding the optical fiber around a bobbin while maintaining the winding tension F such that
   a strain sensing coefficient $T_{\varepsilon/KL}$ defined by the following Expression (2), Expression (3), and Expression (7) is greater than 0 and less than or equal to 973, and
   a one-layer strain $\varepsilon_n$ defined by the following Expression (9) is greater than or equal to 0.01, $$K_{coat} = \frac{(E_p/t_p)^2 \cdot 10^{-19}}{H_0^{0.25\mu-0.125}\left(E_p + \frac{t_s^3}{R_s^3}E_s\right)^{1.125-0.25\mu}} \quad (2)$$

$$H_0 = \frac{\pi}{4}E_s(r_s^4 - r_p^4) \quad (3)$$

$$T_{\varepsilon/KL} = \frac{2Fh}{(D+d+2\times 2h/3)\times d^2} \times \frac{T_w}{E_P} \times \frac{1}{K_{coat}} \times \frac{3000\times 10^3}{(\Delta\beta - 8000)} \quad (7)$$

$$\varepsilon_n = \frac{2F}{(D_f+d)\times d} \times \frac{1}{E_p} \quad (9)$$

where $K_{coat}$ is a coating coefficient,
$E_p$[Pa] is a Young's modulus of a primary layer of the coating that surrounds the bare optical fiber,
$t_p$ [m] is a thickness of the primary layer,
$H_0$ is a secondary rigidity,
$\mu$ is a surface coefficient of the bobbin,
$t_s$ [m] is a thickness of a secondary layer of the coating that surrounds the primary layer,
$R_s$ [M] is an outer diameter of the coating,
$E_s$ [Pa] is a Young's modulus of the secondary layer,
$r_s$ [m] is an outer diameter of the secondary layer,
$r_p$ [m] is an outer diameter of the primary layer,
h [m] is a winding thickness,
D [M] is a barrel diameter of the bobbin,
d [m] is an outer diameter of the optical fiber,
$T_q$ [hr] is a holding time,
$\Delta\beta$ [rad·m$^{-1}$] is a difference between a propagation constant of a fundamental mode propagating and a propagation constant of a next higher mode in the optical fiber, and
$D_f$ [m] is a winding diameter when the optical fiber is wound around the bobbin.

2. The method of manufacturing an optical fiber according to claim 1, further comprising:
   setting at least one of the winding thickness and the holding time, such that the strain sensing coefficient $T_{\varepsilon/KL}$ is greater than 0 and less than or equal to 973.

3. The method of manufacturing an optical fiber according to claim 1, further comprising:
   setting at least one of the outer diameter of the primary layer and the outer diameter of the secondary layer, such that the strain sensing coefficient $T_{\varepsilon/KL}$ is greater than 0 and less than or equal to 973.

* * * * *